US006322150B1

(12) United States Patent
Harper et al.

(10) Patent No.: US 6,322,150 B1
(45) Date of Patent: Nov. 27, 2001

(54) SEAT BELT LAP PILLOW AND POSITIONER FOR USE BY PREGNANT WOMEN

(75) Inventors: Carolyn Harper, Clinton Township; Janice J. Benson, Warren, both of MI (US); Heather McComb, Santa Rosa Beach, FL (US)

(73) Assignee: Harben, Inc., Clinton Township, MI (US)

( * ) Notice: Subject to any disclaimer, the term of this patent is extended or adjusted under 35 U.S.C. 154(b) by 0 days.

(21) Appl. No.: 09/422,627

(22) Filed: Oct. 21, 1999

(51) Int. Cl.[7] .......................... A47D 15/00; A62B 35/00; B60R 21/04
(52) U.S. Cl. ........................ 297/482; 297/488; 297/468; 297/DIG. 1
(58) Field of Search ...................... 297/482, 488

(56) References Cited

U.S. PATENT DOCUMENTS

| 4,575,874 | * | 3/1986 | Johnson | 297/482 X |
| 4,610,463 | | 9/1986 | Efrom | 297/488 X |
| 4,619,468 | | 10/1986 | Spill | 297/482 X |
| 4,678,205 | * | 7/1987 | Wold | 297/482 X |
| 4,693,495 | * | 9/1987 | LaPointe | 297/482 X |
| 4,699,401 | * | 10/1987 | Saenz | 297/482 X |
| 4,741,574 | | 5/1988 | Weightman et al. | 297/482 |
| 4,786,080 | * | 11/1988 | Jay | 297/482 X |
| 4,951,965 | | 8/1990 | Brown | 297/468 X |
| 5,005,865 | | 4/1991 | Kruse | 297/464 X |
| 5,005,866 | * | 4/1991 | Reedom | 297/482 X |
| 5,016,915 | | 5/1991 | Perry | 297/482 |
| 5,161,824 | * | 11/1992 | Li | 297/482 X |
| 5,213,366 | | 5/1993 | Sweger, Jr. | 297/484 X |
| 5,257,854 | | 11/1993 | Korneliussen | 297/468 |
| 5,269,590 | * | 12/1993 | Carilli | 297/DIG. 1 X |
| 5,312,159 | * | 5/1994 | Essa et al. | 297/482 |
| 5,322,349 | * | 6/1994 | Gianino | 297/482 |
| 5,352,024 | | 10/1994 | Grene | 297/485 |
| 5,524,928 | | 6/1996 | Monagas | 297/484 X |
| 5,584,536 | * | 12/1996 | White | 297/482 |
| 5,624,136 | | 4/1997 | McGlothlin et al. | 297/467 X |
| 5,785,388 | | 7/1998 | Curtis | 297/482 |
| 5,795,030 | | 8/1998 | Becker | 297/488 |
| 5,944,380 | * | 8/1999 | Atherley | 297/DIG. 1 X |
| 6,017,094 | * | 1/2000 | Syiek | 297/482 |

FOREIGN PATENT DOCUMENTS

| 3019378 | * | 11/1981 | (DE) | 297/482 |
| 3150489 | * | 6/1983 | (DE) | 297/482 |
| 3434010 | * | 6/1986 | (DE) | 297/482 |
| 3501747 | * | 9/1986 | (DE) | 297/482 |
| 2530208 | * | 1/1984 | (FR) | 297/482 |
| 0000064 | * | 1/1987 | (WO) | 297/482 |

OTHER PUBLICATIONS

"Mother's L'il Helper" product. Blue Ridge International Products Company, Freeport, Florida (1998).
Buckle–Up Buddie brochure. Buckle–Up Buddie Company, P.O. Box 4134, Fullerton, California 92634 (1986).

* cited by examiner

Primary Examiner—Jose V. Chen
Assistant Examiner—Rodney B. White
(74) Attorney, Agent, or Firm—Carter & Schnedler, P.A.

(57) ABSTRACT

A device, particularly for use by a pregnant woman having an enlarged abdomen. The device attaches to the lap belt portion of a vehicle seat belt assembly for increasing comfort and thus encouraging use of the seat belt assembly, as well as to urge the lap belt portion into proper position across the pelvis. The device includes an attachment portion which can be repeatedly attached to and removed from the lap belt, and a cushioning element attached to the attachment portion at the relatively upper edge of the lap belt for padding the relatively upper edge.

7 Claims, 6 Drawing Sheets

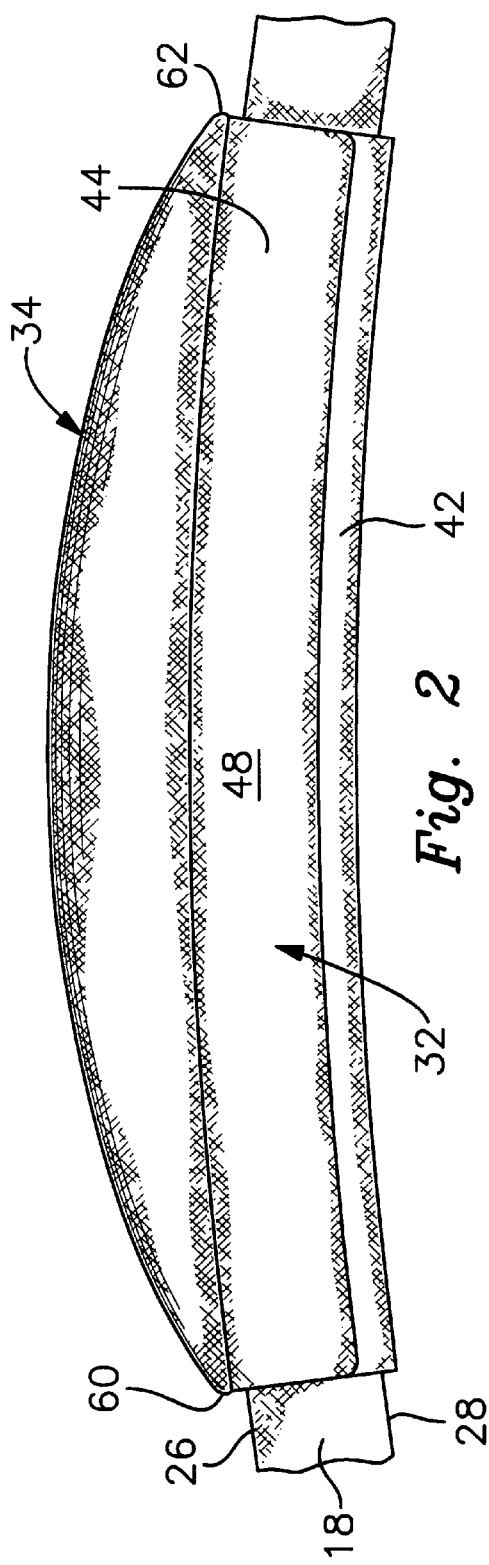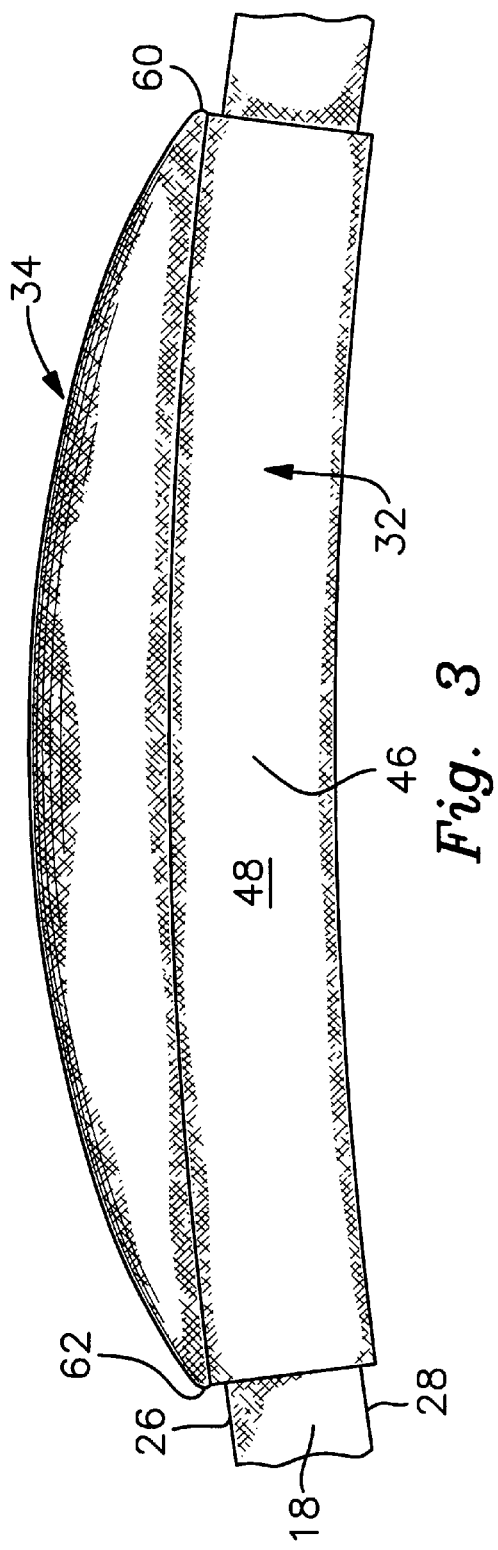

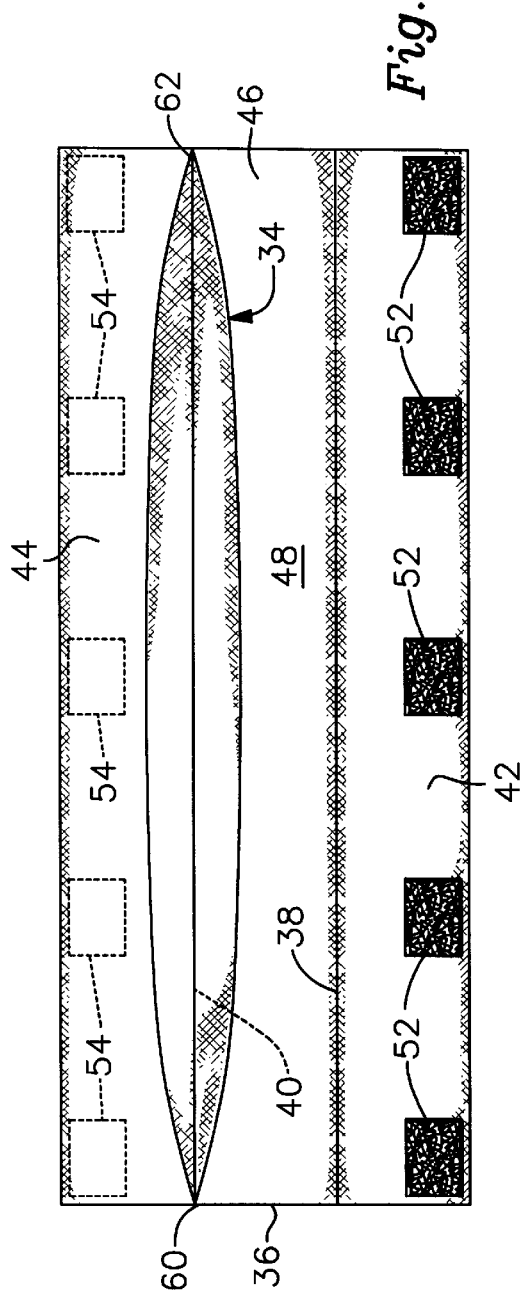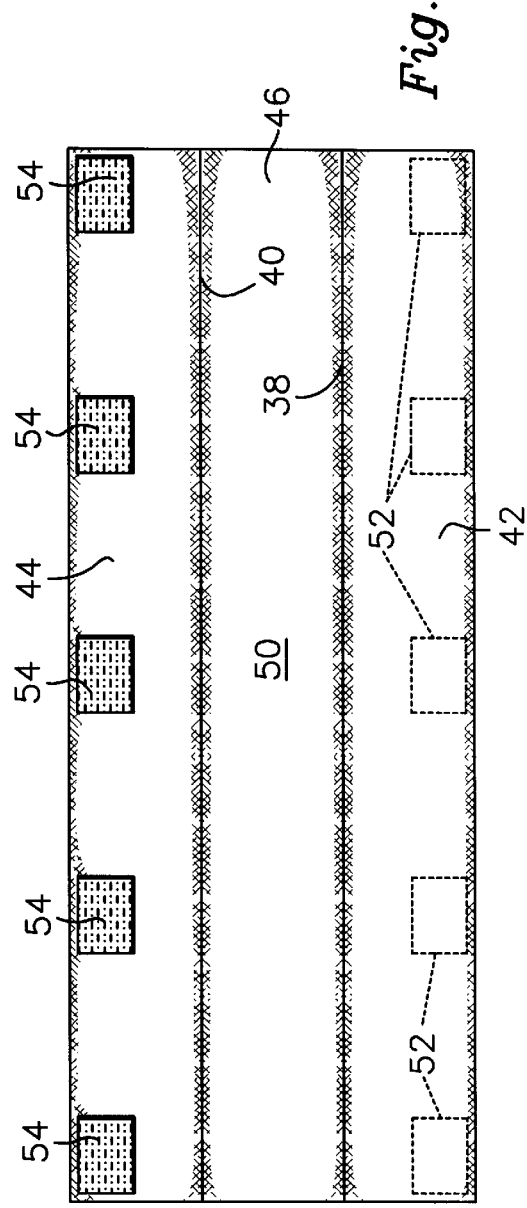

SEAT BELT LAP PILLOW AND POSITIONER FOR USE BY PREGNANT WOMEN

BACKGROUND OF THE INVENTION

The invention relates generally to vehicle seat belt assemblies, which typically include a lap belt and a diagonally-extending shoulder strap. The invention more particularly relates to a device which encourages use of seat belt assemblies by pregnant women, and which also encourages correct positioning the lap belt below the enlarged abdomen of a pregnant women and over the pelvis.

The safety benefits of vehicle seat belt assemblies are well known, and their use is mandated by law in most jurisdictions. However, many pregnant women find the seat belt, particularly the lap belt, to be quite uncomfortable, and, for that reason, will avoid wearing the seat belt assembly, despite good reasons for doing so.

In addition, even when the seat belt assembly is worn, the lap belt tends to extend across the abdomen in an unsafe position, rather than across the pelvis.

SUMMARY OF THE INVENTION

In an exemplary embodiment of the invention, a seat belt lap pillow and positioner for use by pregnant women includes an attachment portion which can repeatedly be attached to and removed from the lap belt, and a cushioning element attached to the attachment portion at the relatively upper edge of the lap belt web for padding the relatively upper edge. Comfort is enhanced, thus encouraging seat belt use, and the lap belt is urged downwardly into proper positioning across the pelvis, and away from the abdomen.

Padding the upper edge in particular of the lap belt web has been found to increase seat belt comfort, thus encouraging use.

BRIEF DESCRIPTION OF THE DRAWINGS

While the novel features of the invention are set forth with particularly in the appended claims, the invention, both as to organization and content, will be better understood and appreciated, from the following detailed description taken in conjunction with the drawing, in which:

FIG. 2 is a front elevational view of the device of FIG. 1, shown attached to a lap belt;

FIG. 3 is a view similar to FIG. 2, but from the opposite side, which faces the abdomen and is hidden during use;

FIG. 4 is a top side plan view of the device of FIG. 1 by itself, with the elongated rectangular panel of the attachment portion unfolded;

FIG. 5 is similar to FIG. 4, but is an underside view;

DETAILED DESCRIPTION

Figure 1:
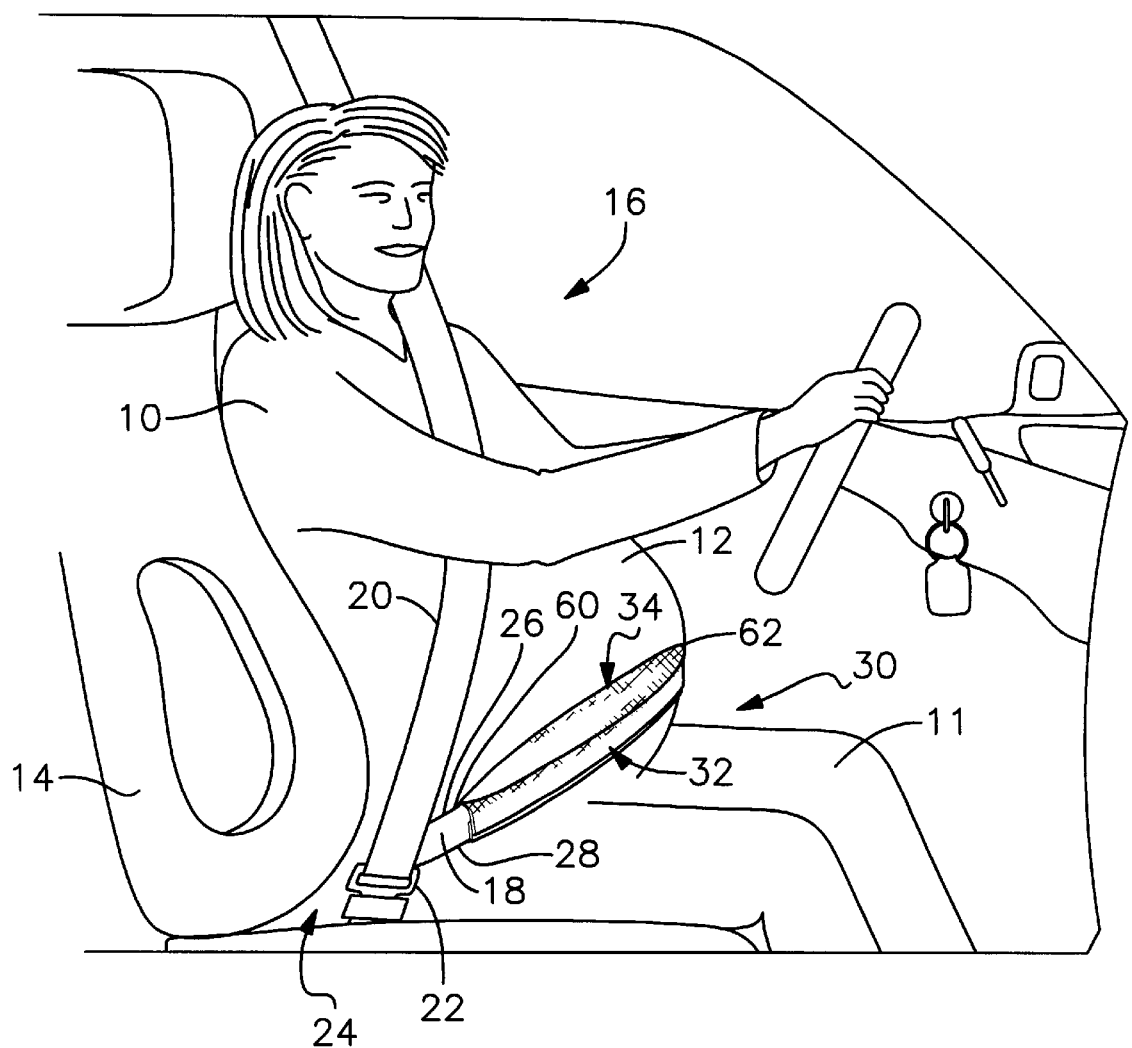
FIG. 1 depicts a device embodying the invention in use.

Referring first to FIG. 1, a pregnant women 10 having legs 11 and an enlarged abdomen 12 is seated in a vehicle seat 14 equipped with a conventional seat belt assembly, generally designated 16, including a lap belt 18 and a diagonally-extending shoulder strap 20 attached to one element 22 of a buckle device 24. The lap belt 18 takes the form of a web having a relatively upper edge 26 and a relatively lower edge 28. A device 30 embodying the invention is attached to the lap belt 18, and can be repeatedly attached and removed as desired.

Referring now, in addition, to FIGS. 2–6, the device 30 includes an attachment portion, generally designated 32, that can be repeatedly attached to and removed from the lap belt 18, and a cushioning element 34 attached to the attachment portion 32 at the relatively upper edge 26 of the lap belt 18 web for padding the upper edge 26.

In the device 30 embodiment, the attachment portion 32 is in the form of an elongated rectangular panel 36 having longitudinal folds 38 and 40 (FIGS. 4 and 5) which subdivide the panel 36 into a pair of edge-adjacent subpanels 42 and 44 and an intermediate subpanel 46. The intermediate subpanel 46 is positioned between the lap belt 18 and the abdomen 12 when the device 30 is in use. The folds 38 and 40 are defined by stitching, which compresses and reduces the thickness of the panel 36 along the folds 38 and 40. In the orientation of FIG. 4, an outside surface 48 of the panel 36 is visible, as well as the cushioning element 34. In FIG. 5, an inside surface 50 of the panel 36 is visible. During use, the edge-adjacent subpanels 42 and 44 are folded along the longitudinal folds 38 and 40, down into the page in the top side orientation of FIG. 4, and out of the page in the under side orientation of FIG. 5.

The edge-adjacent subpanels 42 and 44 are sized so as to overlap when the panel 36 and thus the attachment portion 32 is wrapped around the lap belt 18. The edge-adjacent subpanels 42 and 44 include respective sets of fastener elements 52 and 54, which together comprise a fastener that can be repeatedly fastened and unfastened for joining the edge-adjacent subpanels 42 and 44. In the exemplary embodiment, the fastener elements 52 and 54 are mating elements of a hook-and-loop fastener, commonly known as "Velcro". The fastener elements 52 are attached to the outside surface 48 and are thus visible in the FIG. 4 orientation, and hidden in the FIG. 5 orientation. The fastener elements 54 are attached to the inside surface 50 and are thus visible in the FIG. 5 orientation, and hidden in the FIG. 4 orientation. Other types of fasteners may be employed, such as snaps or zippers, but the hook-and-loop fastener has the advantage of adjustability.

The cushioning element 34 is generally round in cross-section, and tapers to a smaller diameter towards its ends 60 and 62. In the device 30 embodiment of FIGS. 1–6, the cushioning element 34 is contoured to follow the curvature of the lap belt 18 when fastened, as is best seen in FIGS. 2 and 3. The attachment portion 32 and cushioning element 34 each have a length at least sufficient to extend across the abdomen 12. A suitable length is fourteen inches (36 cm).

Figure 6:
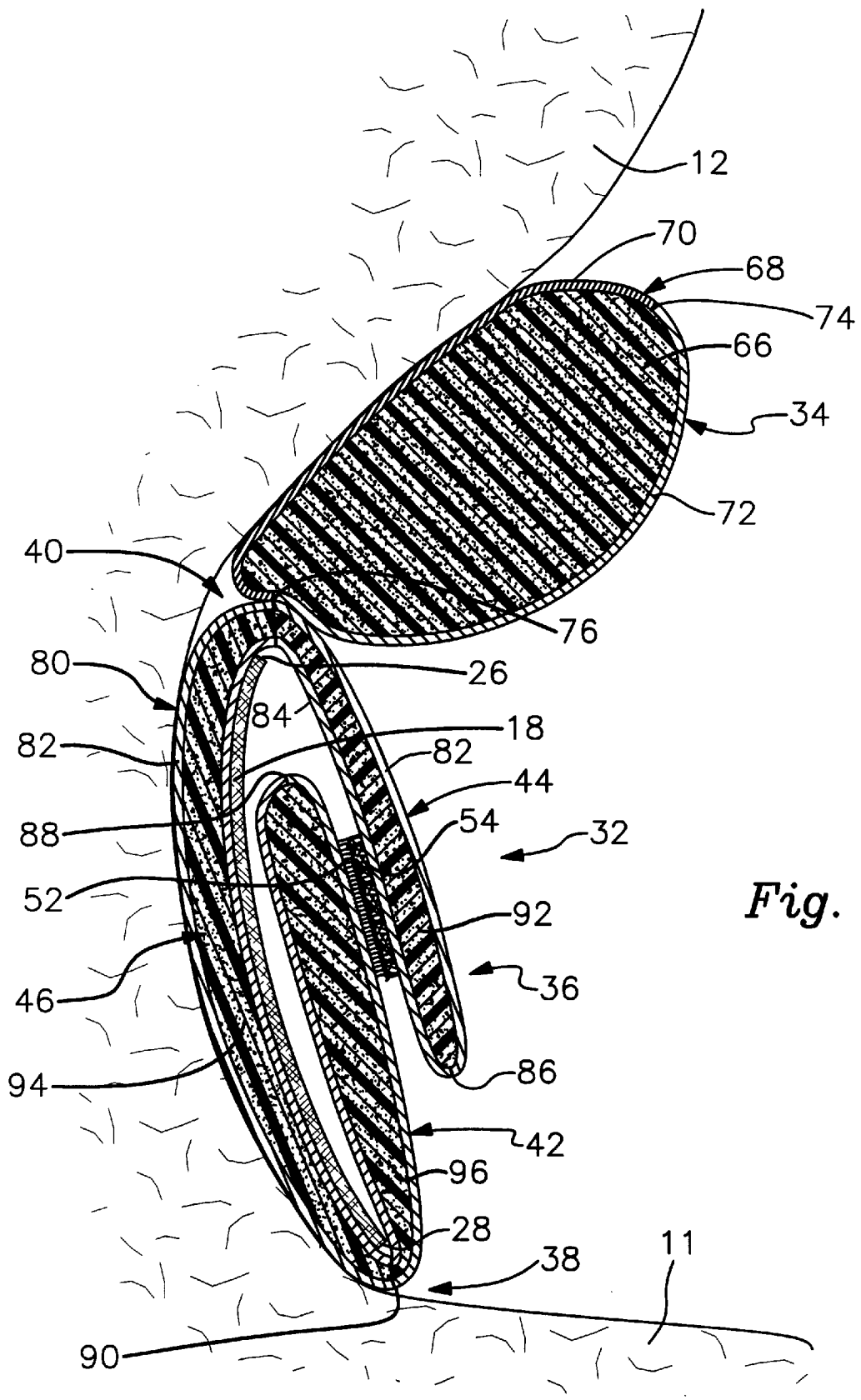
FIG. 6 is an enlarged cross-section of the device of FIG. 1 during use.

With reference to the enlarged cross-section of FIG. 6, during use the cushioning element 34 serves to cushion the relatively upper edge 26 of the lap belt 18 web where it contacts the enlarged abdomen 12. At the same time, the lap belt 18 is urged downwardly so that the relatively lower edge 28 is closely adjacent the legs 11. As a result, the lap belt 18 tends to extend across the pelvis, and not the abdomen 12.

In FIG. 6, the cushioning element 34 includes a core 66 of open-celled foam rubber, and has been deformed from its generally round cross-sectional shape due to engagement with the abdomen 12, while serving its cushioning function.

Around the core 66 is a fabric cover 68 comprising two pieces 70 and 72 sewn together at 74. The fabric pieces 70 and 72 are also sewn together at 76, where the cushioning element 34 is attached by sewing to the attachment portion 32.

The longitudinal panel 36 comprising subpanels 42, 44 and 46 likewise has an outer fabric cover 80, more particularly, comprising a piece of fabric 82 which serves as the outside surface 48 of the panel 36, and a piece of fabric 84 which serves as the inside surface 50 of the panel 36. These pieces of fabric 82 and 84 are sewn together at 86, 88 and 90, as well as at the sewn joint 76 where the attachment portion 32 and cushioning element 34 are joined.

Within the subpanels 42, 44 and 46, encased by the pieces of fabric 82 and 84, are core segments 92, 94 and 96 of open-celled foam rubber material. The core segments 92, 94 and 96 are not as thick as the core 66 of the cushioning element 34.

The cushioning material 94 of the intermediate subpanel 46 is approximately ¼ inch (6.4 mm) in thickness, and thereby serves to slightly cushion the lap belt 18 in general, without unduly interfering with a proper tight fit of the lap belt 18 and accordingly without interfering with the proper safe functioning of the seat belt assembly 16.

Figure 7:
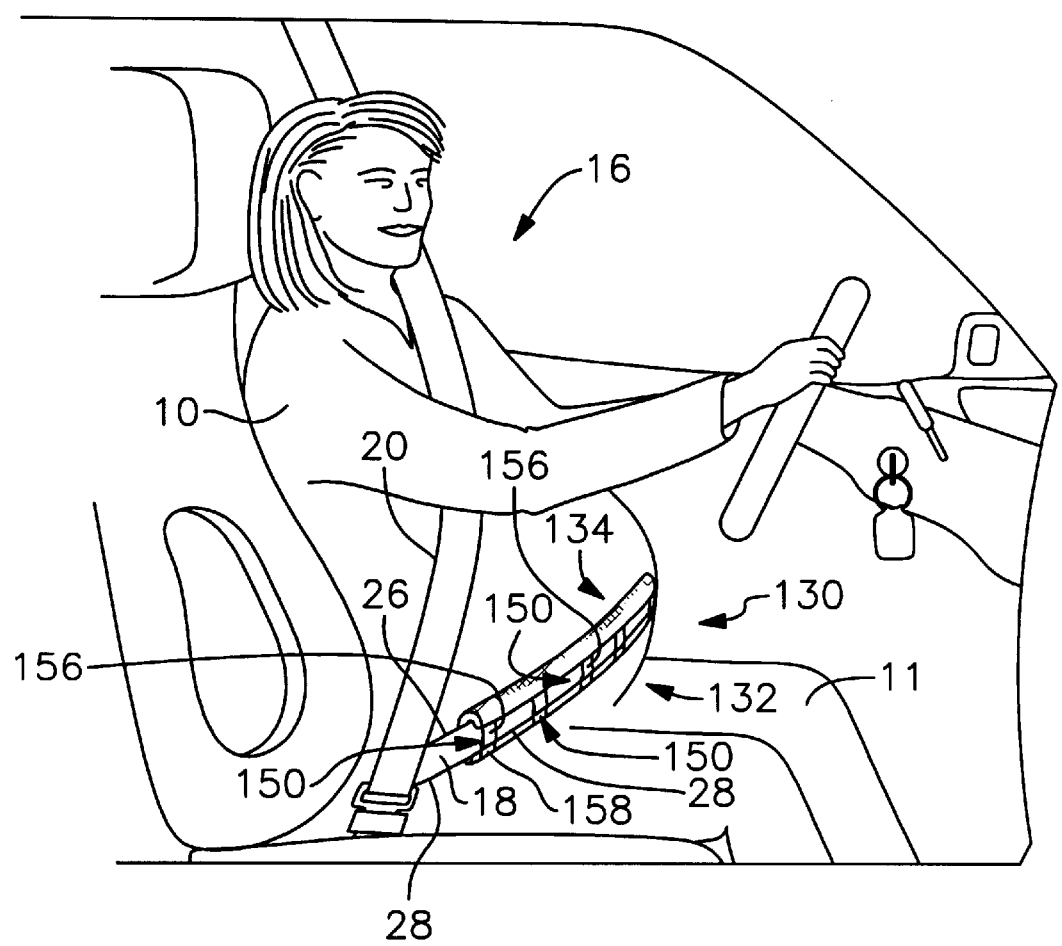
FIG. 7 depicts an alternative device embodying the invention in use.
Figure 8:
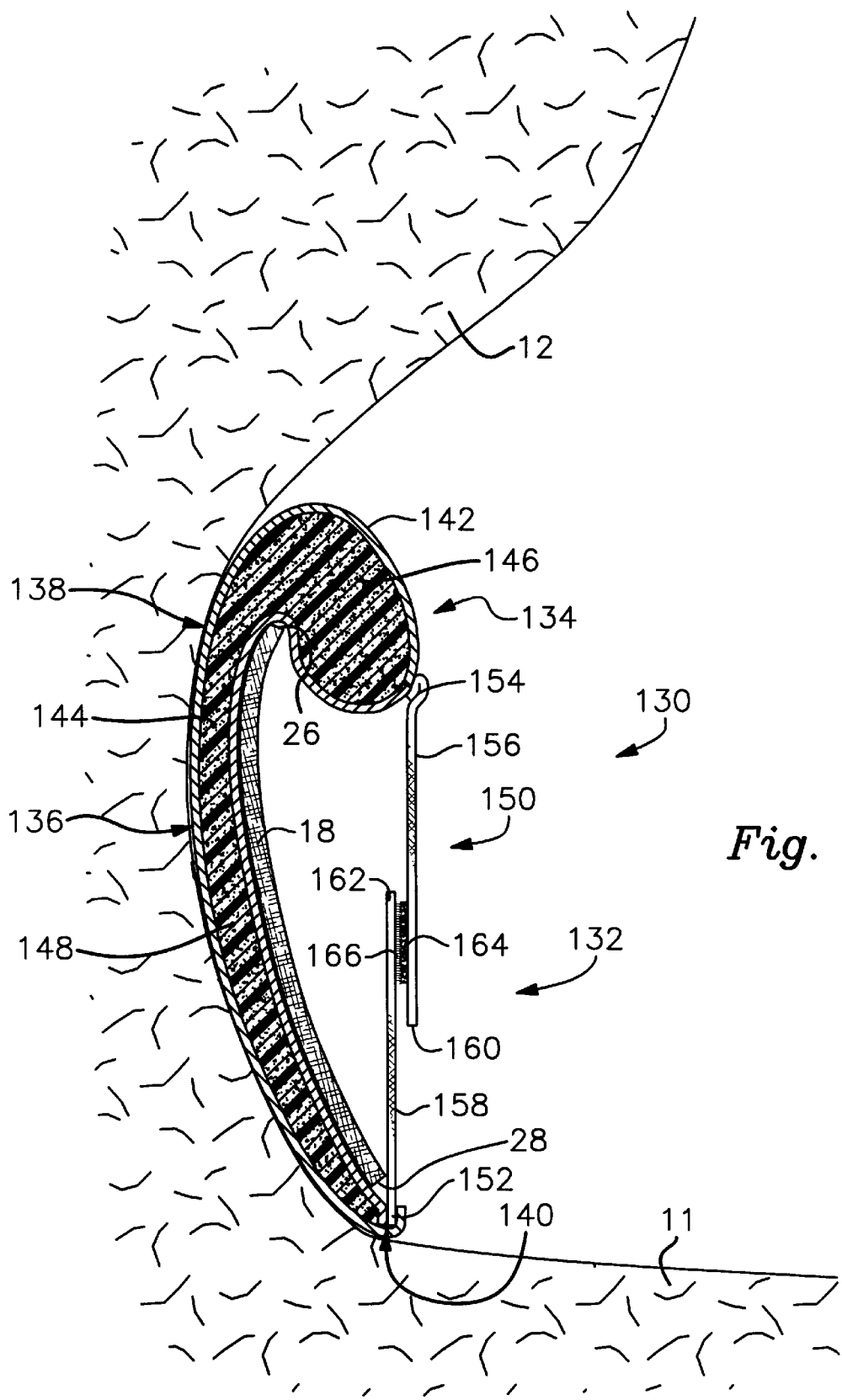
FIG. 8 is an enlarged cross-section of the device of FIG. 7 during use.

Referring next to FIGS. 7 and 8, a alternative device 130 embodying the invention is positioned in essentially the same way as the device 30 of FIGS. 1–6. The device 130 includes an attachment portion generally designated 132 and a cushioning element 134 attached to the attachment portion 132 at the relatively upper edge 26 of the lap belt web 18.

The device 130 includes a base panel 136 having an upper boundary 138 and a lower panel edge 140. The base panel 136 is positioned between the lap belt 18 and the abdomen 12 during use, and thus generally corresponds to the intermediate subpanel 46 of the device 30 embodiment.

In the device 130 embodiment, the cushioning element 134 is an extension of the base panel 136 beginning at the upper boundary 138. The cushioning element 134 is thicker than the base panel 136, and is configured so as to wrap around the relatively upper edge 26 of the lap belt 18 web.

The cushioning element 134 and base panel 136 have an outer fabric cover 142 surrounding a core 144 of open-celled foam rubber. The core 144 has respective integrally-joined portions 146 and 148 corresponding to the cushioning element 134 and the base panel 136.

As part of the attachment portion 132, a set of fastening straps 150 extend between the lower panel edge 140 and the cushioning element 134, and are attached by sewing at 152 and 154.

Each of the straps 150 more particularly comprises an upper segment 156 and a lower segment 158. The segments 156 and 158 have respective ends 160 and 162, and respective elements 164 and 166 of hook-and-loop fastener material 164 and 166 are attached near the ends 160 and 162 for releasably and adjustably attaching the strap segments 156 and 158 to each other.

Accordingly, the invention enhances seat belt comfort and encourages pregnant women to wear their seat belt. Devices embodying the invention allow the seat belt to be tightened properly, and keep the belt in its proper place, under the abdomen. The enhancement of seat belt comfort encouraging use increases the safety of both pregnant women and unborn children.

While specific embodiments of the invention have been illustrated and described herein, it is realized that numerous modifications and changes will occur to those skilled in the art. It is therefore to be understood that the appended claims are intended to cover all such modifications and changes that fall within the true spirit and scope of the invention.

What is claimed is:

1. A device, particularly for use by a pregnant woman having an enlarged abdomen, for attachment to the lap belt portion of a vehicle seat belt assembly, the lap belt being in the form of a web having a relatively upper edge and a relatively lower edge and which has a curvature when fastened, said device comprising:

an attachment portion that can repeatedly be attached to the lap belt for use and removed from the lap belt when not in use, said attachment portion comprising an elongated rectangular panel having longitudinal folds so as to wrap around the lap belt, and said attachment portion including cushioning material; and a discrete cushioning element attached to said attachment portion so as to be positioned during use at the relatively upper edge of the lap belt web and extending outwardly from the relatively upper edge for cushioning the relatively upper edge where contact is made with the enlarged abdomen, said cushioning element being generally round in cross section, having a length at least sufficient to extend across the abdomen, and tapering to a smaller diameter towards its ends.

2. The device of claim 1, wherein said attachment portion and said cushioning element each have a length at least sufficient to extend across the abdomen.

3. The device of claim 1, wherein said cushioning element is contoured to follow the curvature of the lap belt when fastened.

4. The device of claim 1, wherein said cushioning element comprises open-celled foam rubber.

5. The device of claim 1, wherein said cushioning element is contoured to follow the curvature of the lap belt when fastened.

6. The device of claim 1, wherein the folds subdivide said rectangular panel into two edge-adjacent subpanels and an intermediate subpanel, such that said edge-adjacent subpanels overlap when said attachment portion is wrapped around the lap belt, and which further comprises a fastener that can be repeatedly fastened and unfastened for joining said edge-adjacent subpanels.

7. The device of claim 6, wherein said intermediate subpanel faces the abdomen when said device is attached to the lap belt.

* * * * *